Nov. 17, 1959  YAO T. LI ET AL  2,913,693
UNBONDED ELECTRICAL RESPONSIVE STRAIN GAGE TRANSDUCER
Filed May 6, 1957  2 Sheets-Sheet 1
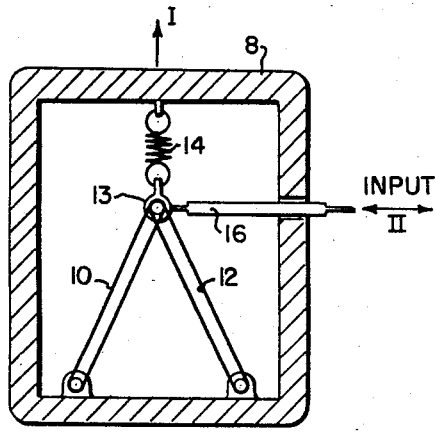
Fig. 1
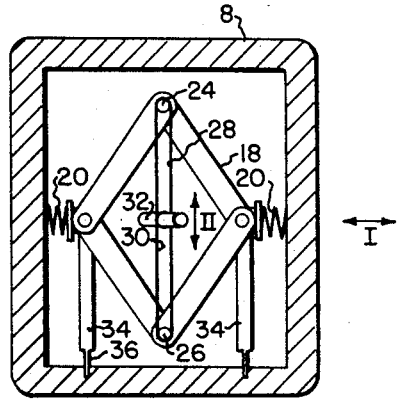
Fig. 2
Fig. 3
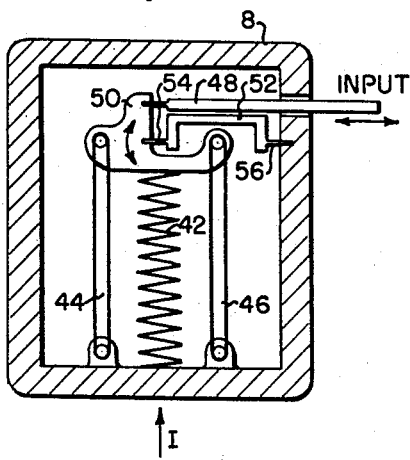
Fig. 4
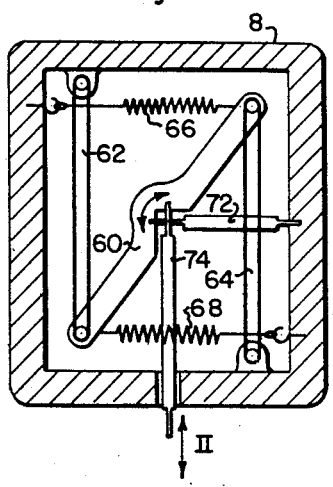
INVENTORS
YAO TZU LI
SHIH-YING LEE
BY KENWAY, JENNEY, WITTER & HILDRETH
ATTORNEYS

INVENTORS
YAO TZU LI
SHIH-YING LEE
BY KENWAY, JENNEY, WITTER & HILDRETH

ATTORNEYS

United States Patent Office 2,913,693
Patented Nov. 17, 1959

2,913,693

UNBONDED ELECTRICAL RESPONSIVE STRAIN GAGE TRANSDUCER

Yao T. Li and Shih-Ying Lee, Watertown, Mass.

Application May 6, 1957, Serial No. 657,423

7 Claims. (Cl. 338—6)

The present invention relates to unbonded strain gage transducers.

The usual transducer employing unbonded strain wires utilizes at least a pair of wires to compensate for temperature effects. Both wires are placed under initial tension, and the transducers are arranged so that the strain to be measured causes an increase of tension in one wire and a decrease in tension in the other. On the other hand, resistance changes which affect the wires equally, as in the case of temperature variations, result in output signals which buck each other so that such variations are compensated.

Since the wires must have an initial tension, there is a possibility that under wide temperature variations the wires may slacken sufficiently so that a strain measurement will be vitiated by letting one of the wires go to zero tension. It is also possible that temperature changes may result in overstretching of the wires.

It is possible to prevent undue slackening by mounting the wires with very soft springs, that it with springs which have spring constants materially smaller than the spring constants of the wire itself. However, in most such applications the major part of the input energy is absorbed by the springs rather than by the wires.

According to the present invention the strain wires are maintained under suitable tension, preferably with relatively soft springs, and are arranged so that the structure has two independent and substantially uncoupled modes of receiving input energy. In the preferred forms of the invention the apparatus provides a rigid member which has two degrees of freedom, together with strain wires and appropriate spring supports therefor, whereby motion of the rigid member in one of its degress of freedom causes strains of like sign to be generated in the wires and motion in the other degree of freedom causes strains of opposite signs to be generated. The two degrees of freedom are conveniently referred to as mode I and mode II respectively, and the modes are substantially uncoupled, which means that when an increment of energy is applied in either mode, no substantial motion is caused in the other mode.

In the best form of the invention thus far devised the two modes are at axes at right angles to one another, either both linear or with one linear and one rotational.

In the accompanying drawings illustrating the preferred forms of the invention Fig. 1 is a semi-diagrammatic view of a strain gage assembly in which the two modes of applying energy are both linear;

Fig. 2 is a diagram of another arrangement in which the modes are also both linear;

Figs. 3 and 4 are diagrams in which the modes are linear and rotational; and

Figure 5:
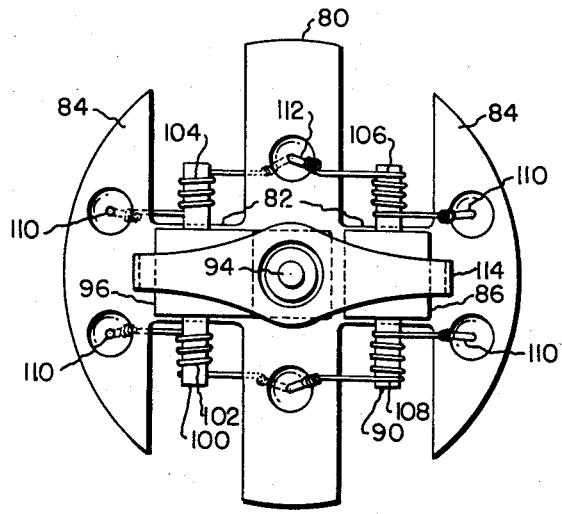
Figs. 5 and 6 are a plan and elevation, respectively, of a preferred construction according to the present invention.

The simplest form of the present invention is illustrated in Fig. 1 in which a rigid frame 8 has two strain wires 10 and 12 maintained under initial tension by a spring 14. The wires 10 and 12 are connected between a button 13 and the frame, and may be wound in any manner suitable for unbonded strain gages, here shown as single-turn loops. These loops form the legs of a triangle, and the spring 14, which acts in a vertical direction as shown in Fig. 1, applies equal tension to the legs. The spring has a small spring constant relative to the wires whereby changes in temperature result in no substantial change in tensions of the wires. The axis of the spring force is linear and is indicated by I in Fig. 1; this constitutes mode I for application of force to the strain gage.

Mechanical energy is applied to the strain wire structure in mode II, which is in the direction of the horizontal axis as indicated in the drawing. To this end a suitable connection 16 is made to the button 13 to which the wires 10 and 12 and the spring 14 are connected.

The connector 16 may be connected to any suitable diaphragm or other device, the motion of which is to be measured. On motion in a horizontal direction through the connector 16 one of the wires is increased in tension and the other is relaxed. Thus output signals of opposite sign are obtained which are caused to reinforce each other in the usual manner, whereby an electrical output proportional to the strain is obtained.

Horizontal motion by means of the connector 16 does not sensibly change the direction or magnitude of the force exerted by the spring 14. Moreover the force due to the spring 14 which is at all times along or very nearly along the axis I applies equal forces to the wires and hence does not result in the introduction of mechanical energy to the system along the horizontal axis II. The two modes of applying energy to the strain wire system are therefore uncoupled. The button 13 therefore constitutes a "rigid body" having two degrees of freedom represented by the axes I and II which are at right angles to one another.

Another form of linear device is shown in Fig. 2. Within the rigid structure 8 there is provided a four-bar diamond shaped linkage 18 which is pivoted at the four corners. Compression springs 20 pressing inwardly from the frame 8 act along the horizontal axis in mode I. Connected between the pivots 24 and 26 at the upper and lower ends of the diamond structure are two strain wires 28 and 30 which are connected at the middle of the structure to a pin 32. The diamond structure is maintained in proper position within the frame 8 by means of "flexures" 34, each of which consists of a bar connected to the horizontal pivots, each bar 34 being mounted on a short flat spring 36 which will permit limited collapsing movement of the diamond frame.

The strain to be measured is introduced vertically through the pin 32 in the direction of the arrows represented by II. It will be observed that the diamond structure 18 together with the strain gage wires may be considered to have two degrees of freedom; one degree of freedom is a collapsing movement along the horizontal axis I under the action of the springs 20, while the other is a movement in the vertical direction of the pin 32 along the axis II. The axes I and II are again mutually perpendicular, and the modes are uncoupled, in that motion of the pin 32 results in no substantial change in the direction or magnitude of the forces applied by the springs 20; furthermore any motions along axis II due to equal changes in the lengths of the wires (as by temperature changes, for example) simply act to maintain proper tension on the wires without causing differential strains.

The invention is also adaptable to combined linear and rotational modes. In Fig. 3 the frame 8 encloses a rocker 50 which is supported on a soft compression spring 42 acting along a vertical axis I. At the ends of the rocker are strain wires 44 and 46 which are connected to the bottom of the frame 8 and which are maintained under initial tension by the force due to the spring. A rocking motion may be transmitted to the rocker by means of a connection 48 to an upstanding leg of the rocker 50. The position of the rocker within the frame is determined by a flexure member 52 connected to the rocker and to the frame by short leaf springs 54 and 56.

The rocker constitutes a rigid body having a linear degree of freedom in mode I, and a rotational degree of freedom in mode II as indicated by the curved arrow. In accordance with the usual convention for rotary motions, the axis of mode II is perpendicular to the plane of the drawing. The forces applied in mode I tensions both wires equally, while a moment applied in mode II increases the tension on one wire and reduces the tension on the other. As in the cases previously described, the modes are uncoupled in that a change in temperature for example will result in equal changes in the lengths of both wires by a slight linear motion along axis I, while a rocking motion introduced through 48 causes little or no change in the compression of spring 42.

In Fig. 4 the rigid body comprises a diagonal strut 60 within the frame 8. The strut is supported by two strain wires 62 and 64 shown as connected vertically between the ends of the strut and the top and bottom of the frame, and two soft springs 66 and 68 connected between the ends of the strut and the left and right side walls of the frame. A flat spring member 72 connected between the frame and the center of the strut serves to maintain it in position in the plane.

Mode I is a rotational mode introduced by the springs tending to rotate the strut counterclockwise about an axis through its center, thereby tensioning both wires equally. The input axis for mode II is vertical through a connecter 74. Thus the two axes of freedom of the strut are perpendicular to each other. As in the types previously described, the modes are uncoupled in that motion in one mode produces no substantial motion in the other.

Figure 6:
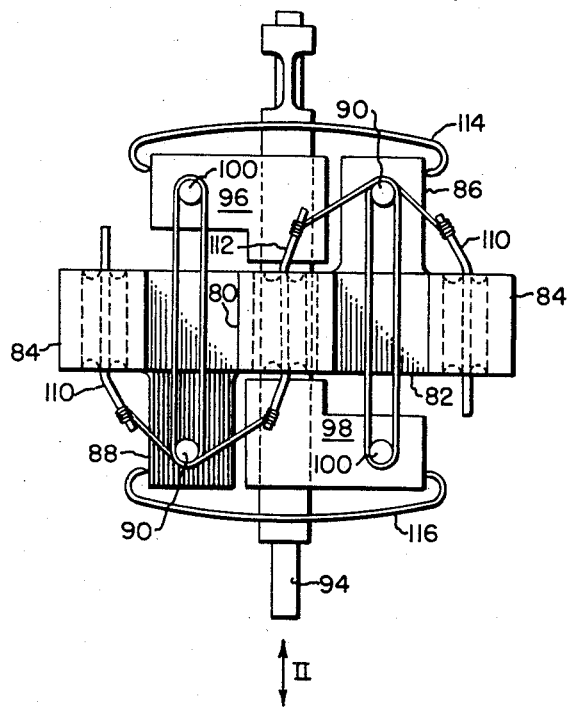

A form of the invention adapted for practical manufacture in small size is shown in Figs. 5 and 6. A rigid supporting frame 80 is in the general form of a central bar, having an integral crossbar 82 which carries integral terminal blocks 84, preferably in the form of circular arcs. The crossbar 82 carries at one side of the center an upwardly extending anchor block 86 and at the other side of the center a downwardly extending anchor block 88, each of which is provided with a strain wire anchoring pin 90.

The bar 80 is provided with a central hole through which passes a spindle 94. Above the bar 80 an L-shaped block 96 is attached to the spindle and has a portion overlying the anchor block 88. Below the bar 80 there is also attached an L-shaped block 98 having a portion underlying the anchor block 86. The blocks 96 and 98 are provided with insulating winding pins opposite the pins 90. Two pairs of strain wires 102, 104 and 106, 108 are wound on the pins 90 and 100, and the ends of the wires are suitably anchored to terminals 110 in the blocks 84 and terminals 112 in the central bar 80, the terminals being suitably secured in insulating plastic poured into suitable holes in the terminal blocks and the bar.

It will be observed that the four sets of strain gage wires act in a direction parallel to the axis of the spindle, namely, in a vertical direction as indicated in Fig. 6. This is the axis of mode II, namely, the axis of the forces or motions to be measured.

Mode I is applied rotationally by means of curved springs 114 and 116. The spring 114 spans the anchor block 86 and the movable block 96, while the spring 116 spans the anchor block 88 and the movable block 98. The two springs have openings through which the spindle passes. The direction of the spring force is rotational, namely, in a direction to urge the blocks 96 and 98 toward the anchor blocks 86 and 88 respectively.

This rotational mode constitutes mode I and is the means by which tension is applied to the strain wires. As in the cases previously described, the modes are substantially uncoupled, in that equal changes in tension are taken up by the action of the springs 114 and 116 in causing a slight rotational motion about an axis perpendicular to the plane of the drawing, while the measuring motion is along the axis of the spindle.

Having thus described the invention, we claim:

1. A strain gage transducer comprising a rigid frame, a body member movable relative to the frame in two degrees of freedom with respect to two mutually perpendicular axes, two unbonded strain gage wires each fixedly secured at one end to the frame and attached at the other end to the body member, tensioning means for resiliently connecting the body member to the frame and acting in the direction of one of said axes to apply equal tensions to the wires, and input means to apply an input force to the body member in the direction of the other of said axes to stress the wires in opposite senses.

2. A strain gage transducer according to claim 1, in which the tensioning means acts along a linear axis to apply a force to the body member to tension the wires equally, and the input means acts along a second linear axis perpendicular to the axes of the tensioning means.

3. A strain gage transducer according to claim 1, in which the body member is mounted for rotational and linear degrees of freedom on axes perpendicular to each other, the tensioning means acts on one axis to tension the wires equally, and the input means acts on the other axis to stress the wires in opposite senses.

4. A strain gage transducer according to claim 3 in which the tensioning means comprises a spring acting along the linear axis and the input means acts to apply a movement about the rotational axis.

5. A strain gage transducer according to claim 3 in which the tensioning means comprises a spring acting to apply a movement to the body member about the rotational axis and the input means acts to apply a force along the linear axis.

6. A strain gage transducer comprising a rigid frame having anchor blocks extending in different directions on opposite sides thereof, the frame having an opening, a spindle passing through the opening and having wire supports thereon disposed on opposite sides of the frame, the spindle and wire supports constituting a rigid body having two degrees of freedom, one along the axis of the spindle and one rotational, spring means connected between each wire support and its adjacent anchor block to stress the rigid body in the rotational mode, and strain wires, each connected at one end from one of the supports and fixedly secured at the other end to the anchor block on the opposite sides of the frame, to be sensitive to motion of the rigid body in the axial mode.

7. A strain gage transducer comprising a rigid frame having an opening therethrough, a spindle passing through the opening and constituting a rigid body having a linear mode of motion along its axis and a rotational mode relative to the frame, wire supports secured near opposite ends of the spindle and offset from the axis thereof, each strain wire being connected at one end to one of the wire supports and at the other end to the frame, said wires being fixedly secured to the frame and sensitive to motions in the axial direction and the tension on the wires acting to turn the spindle in the rotational mode, and spring means acting on the spindle and the frame in the rotational mode to tension the wires.

References Cited in the file of this patent
UNITED STATES PATENTS

| | | |
|---|---|---|
| 2,600,701 | Statham | June 17, 1952 |
| 2,721,918 | Yao T. Li | Oct. 25, 1955 |
| 2,721,919 | Yao T. Li et al. | Oct. 25, 1955 |
| 2,760,037 | Statham | Aug. 21, 1956 |